United States Patent
McCormick

(10) Patent No.: US 11,538,076 B1
(45) Date of Patent: Dec. 27, 2022

(54) MACHINE LEARNING SYSTEMS FOR COMPUTER GENERATION OF AUTOMATED RECOMMENDATION OUTPUTS

(71) Applicant: Cigna Intellectual Property, Inc., Wilmington, DE (US)

(72) Inventor: Jeffrey R. McCormick, Cheshire, CT (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 157 days.

(21) Appl. No.: 17/101,192

(22) Filed: Nov. 23, 2020

(51) Int. Cl.
- *G06Q 30/02* (2012.01)
- *G06N 20/00* (2019.01)
- *G06F 16/2457* (2019.01)

(52) U.S. Cl.
CPC ... *G06Q 30/0282* (2013.01); *G06F 16/24578* (2019.01); *G06N 20/00* (2019.01); *G06Q 30/0203* (2013.01); *G06Q 30/0205* (2013.01)

(58) Field of Classification Search
CPC .......... G06Q 30/0282; G06Q 30/0203; G06Q 30/0205
See application file for complete search history.

(56) References Cited

U.S. PATENT DOCUMENTS

| | | | |
|---|---|---|---|
| 8,185,413 B2 | 5/2012 | Melnick | |
| 8,290,790 B1 | 10/2012 | Jackson | |
| 10,373,230 B2 | 8/2019 | Walti | |
| 10,430,725 B2 | 10/2019 | Anderson | |
| 10,699,218 B2 | 6/2020 | Anderson | |
| 2003/0187694 A1 | 10/2003 | Rowen | |
| 2004/0167786 A1 | 8/2004 | Grace | |
| 2006/0089862 A1 | 4/2006 | Anandarao | |
| 2006/0248008 A1 | 11/2006 | Lind | |
| 2007/0055601 A1 | 3/2007 | Inderski | |
| 2009/0276249 A1 | 11/2009 | Dust | |
| 2014/0114674 A1* | 4/2014 | Krughoff | G06Q 10/10 705/2 |

(Continued)

OTHER PUBLICATIONS

"A cloud based health insurance plan recommendation system: A user centered approach" (Abbas, Assad et al.; available online Aug. 27, 2014 at www.elsevier.com (Year: 2014).*

*Primary Examiner* — James M Detweiler
(74) *Attorney, Agent, or Firm* — Miller Johnson

(57) ABSTRACT

A computerized method of automatically generating a recommendation output includes training a machine learning model with historical feature vector inputs to generate a recommendation output, generating a set of inputs specific to an entity, and transforming the set of inputs into a profile data structure. The profile data structure includes multiple attributes. The transforming includes, for each attribute, assigning a preference according to the set of inputs. The method includes obtaining structured supplemental data associated with the entity. The method includes obtaining a set of option identifiers by filtering the option identifiers according to option criteria specific to the entity. The method includes creating a feature vector input according to the set of option identifiers, the structured supplemental data, and the assigned preferences of the profile data structure. The method includes processing, by the machine learning model, the feature vector input to generate the recommendation output.

15 Claims, 11 Drawing Sheets

(56) References Cited

U.S. PATENT DOCUMENTS

| | | |
|---|---|---|
| 2016/0203266 A1 | 7/2016 | Mazonson |
| 2016/0364783 A1 | 12/2016 | Ramanuja |
| 2018/0374174 A1* | 12/2018 | Clancy .................. G16H 50/30 |
| 2019/0035040 A1* | 1/2019 | Goel ...................... G06Q 40/08 |
| 2019/0108353 A1 | 4/2019 | Sadeh |
| 2019/0304023 A1* | 10/2019 | Pingali .................. G16H 50/30 |
| 2019/0377819 A1 | 12/2019 | Filliben |
| 2020/0005166 A1 | 1/2020 | Reich |
| 2020/0005214 A1 | 1/2020 | Kulkarni |
| 2020/0134691 A1* | 4/2020 | Wiseman, Sr. ........ G06Q 40/08 |
| 2020/0160670 A1 | 5/2020 | Zalewski |
| 2020/0167869 A1 | 5/2020 | Magdelinic |
| 2020/0364768 A1* | 11/2020 | Price .................. G06Q 30/0639 |
| 2021/0065132 A1* | 3/2021 | Yang .................... G06Q 20/202 |
| 2021/0065203 A1* | 3/2021 | Billigmeier ............ G06N 20/00 |

\* cited by examiner

| | Required | Desired | Indifferent | Less Desired | Not Desired |
|---|---|---|---|---|---|
| Plan Data Attributes | | | | | |
| Individual Plan | ◈ | ○ | ○ | ○ | ○ |
| Medical Coverage | ◈ | ○ | ○ | ○ | ○ |
| Low Premium | ○ | ◈ | ○ | ○ | ○ |
| High Deductible | ○ | ◈ | ○ | ○ | ○ |
| In-Network Providers | ○ | ○ | ◈ | ○ | ○ |
| Health Savings Account | ○ | ○ | ○ | ◈ | ○ |
| Maternity Benefit | ○ | ○ | ○ | ○ | ◈ |
| Demographic Data Attributes | | | | | |
| Age | 62 | | | | |
| Location | Los Angeles, CA | | | | |

Rating Scale - "Required" weighted higher than "Not Desired"

List Preference → Individual Plan
Category Preference → High Deductible
Binary Preference → Health Savings Account

FIG. 3

|  | Plan A | Plan B | Plan C |
|---:|:---:|:---:|:---:|
| Plan Type | Individual | Individual | Family |
| Medical Coverage | Yes | Yes | Yes |
| Premium | $5,000 | $6,000 | $6,000 |
| Deductible | $4,000 | $3,000 | $5,000 |
| In-Network Providers | Yes | Yes | Yes |
| HSA Employer Contribution | $2K | $1,500 | $2K |
| Maternity Benefit | Not Covered | $5,000 | $6,000 |
| Comprehensive COVID-19 Coverage | 100% | 80% | 50% |

FIG. 5A

| Public Health | |
|---:|:---:|
| COVID-19 Hot Spot | Los Angeles, CA |
| COVID-19 Thrives in Higher Temperatures | Yes |
| COVID-19 age spike | 60 and Above |
| Claim | |
| High Risk Conditions | Respiratory Illness |
| Demographic | |
| Death Rate Spike | Over 60 in Los Angeles, CA |
| Environmental | |
| Higher Than Normal Temperatures | Los Angeles, CA |

FIG. 5B

|  | Plan A | Plan B | Plan C |
|---|---|---|---|
| Plan Type | Individual | Individual | Family |
| Medical Coverage | Yes | Yes | Yes |
| Low Premium | $5,000 | n/a | n/a |
| Moderate Premium | n/a | $6,000 | $6,000 |
| High Premium | n/a | n/a | n/a |
| Low Deductible | n/a | $3,000 | n/a |
| Moderate Deductible | $4,000 | n/a | n/a |
| High Deductible | n/a | n/a | $5,000 |
| In-Network Providers | Yes | Yes | Yes |
| HSA Employer Contribution | $2K | $1,500 | $2K |
| Maternity Benefit | Not Covered | $5,000 | $6,000 |
| Comprehensive COVID-10 Coverage | 100% | 80% | 50% |

FIG. 7A

| Required = 3 | Desired = 2.5 | Indifferent = 2 | Less Desired = 1.5 | Not Desired = 0 |
|---|---|---|---|---|

FIG. 7B

|  | Plan A | Plan B | Plan C |
|---:|:---:|:---:|:---:|
| Plan Type | 2 | 2 | 0 |
| Medical Coverage | 2 | 2 | n/a |
| Low Premium | 2 | n/a | n/a |
| Moderate Premium | n/a | 1 | n/a |
| High Premium | n/a | n/a | n/a |
| Low Deductible | n/a | 2 | n/a |
| Moderate Deductible | 1 | n/a | n/a |
| High Deductible | n/a | n/a | n/a |
| In-Network Providers | 2 | 2 | n/a |
| HSA Employer Contribution | 2 | 1 | n/a |
| Maternity Benefit | 0 | 0 | n/a |
| Comprehensive COVID-10 Coverage | 2 | 1 | n/a |

FIG. 9A

|  | Required | Desired | Indifferent | Less Desired | Not Desired |
|:---:|:---:|:---:|:---:|:---:|:---:|
| 0 | 0 | 0 | 0 | 0 | 0 |
| 1 | 3 | 2.5 | 2 | 1.5 | 0 |
| 2 | 6 | 5 | 4 | 2.5 | 0 |

FIG. 9B

| | Plan A | Plan B | Plan C |
|---|---|---|---|
| Plan Type | 6 | 6 | 0 |
| Medical Coverage | 6 | 6 | X |
| Low Premium | 5 | 0 | X |
| Moderate Premium | 0 | 2.5 | X |
| High Premium | 0 | 0 | X |
| Low Deductible | 0 | 5 | X |
| Moderate Deductible | 2.5 | n/a | X |
| High Deductible | 0 | 0 | X |
| In-Network Providers | 4 | 4 | X |
| HSA Employer Contribution | 2.5 | 1.5 | X |
| Maternity Benefit | 0 | 0 | X |
| Comprehensive COVID-10 Coverage | 5 | 2.5 | X |
| Total | 31 | 27.5 | 0 |

FIG. 9C

|  | Plan A | Profile Match |
|---|---|---|
| Required | | |
| Plan Type | Individual | Yes |
| Medical Coverage | Yes | Yes |
| Desired | | |
| Premium | $5,000 | Yes |
| Deductible | $4,000 | Partial |
| Indifferent | | |
| In-Network Providers | Yes | Yes |
| Less Desired | | |
| HSA Employer Contribution | $2,000 | Yes |
| Not Desired | | |
| Maternity Benefit | n/a | Yes |
| Suggested Desired Features | | |
| Comprehensive COVID-10 Coverage | 100% | Suggested |

FIG. 9D

MACHINE LEARNING SYSTEMS FOR COMPUTER GENERATION OF AUTOMATED RECOMMENDATION OUTPUTS

FIELD

The present disclosure relates to computer generation of automated recommendation outputs, and more particularly to machine learning systems that generate individualized recommendation outputs.

BACKGROUND

Healthcare enrollment is often a complex process that may be difficult for individuals having little experience with details of various health care plan options. These individuals are often left to sift through one-size-fits-all health plan offerings without any meaningful guidance. In addition, an individual may not be aware of all of the various factors that can impact selection of the best plan specific to the individual's needs, which may lead to frustration and confusion.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized method of automatically generating a recommendation output includes training a machine learning model with historical feature vector inputs to generate a recommendation output. The historical feature vector inputs include historical profile data structures specific to multiple entities, historical structured supplemental data, and historical structured data for a plurality of option identifiers. The method includes generating a set of inputs specific to an entity, where the set of inputs are derived according to response data obtained from the entity. The method also includes transforming the set of inputs into a profile data structure. The profile data structure includes multiple attributes. The transforming includes, for each attribute, assigning a preference according to the set of inputs. The method further includes obtaining structured supplemental data associated with the entity. The structured supplemental data includes at least one of medical claim history data fields associated with the entity, demographic data fields associated with the entity, environmental data fields associated with a location of the entity, public health data fields associated with the location of the entity, and financial data fields associated with the entity. The method further includes obtaining a set of option identifiers from the plurality of option identifiers. Obtaining the set of option identifiers includes filtering the plurality of option identifiers according to option criteria specific to the entity. The method also includes creating a feature vector input according to the set of option identifiers, the structured supplemental data, and the assigned preferences of the profile data structure, and processing, by the machine learning model, the feature vector input to generate the recommendation output. The recommendation output includes at least one of the set of option identifiers having a greater match score than another of the set of option identifiers based on the structured supplemental data and the assigned preferences of the profile data structure. The method further includes transforming a user interface based on the recommendation output, to display the recommendation output to the entity.

In other features, the method includes determining whether historical profile data structures are stored in a database with corresponding structured supplemental data and selected option identifiers, generating the historical feature vector inputs using the historical profile data structures stored in the database, in response to a determination that historical profile data structures are stored in a database with corresponding structured supplemental data and selected option identifiers, and generating the historical feature vector inputs using created sample profile data structures, in response to a determination that historical profile data structures are not stored in a database with corresponding structured supplemental data and selected option identifiers.

In other features, training the machine learning model includes comparing multiple recommendation outputs of the machine learning model to historical option identifier selections or created sample option identifier selections, determining whether an accuracy of the comparison is greater than or equal to a specified accuracy threshold, adjusting parameters of the machine learning model or selecting a different machine learning model type for retraining the machine learning model, in response to a determination that the accuracy of the comparison is less than the specified accuracy threshold, and saving the machine learning model for use in generating recommendation outputs, in response to a determination that the accuracy of the comparison is greater than or equal to the specified accuracy threshold.

In other features, training the machine learning model includes training multiple machine learning model types simultaneously or in succession, identifying one of the multiple machine learning model types having a highest output accuracy compared to the other machine learning model types, and saving the identified machine learning model type having the highest output accuracy for use in generating recommendation outputs.

In other features, the method includes pre-processing the structured supplemental data and the set of option identifiers to generate the feature vector input. The pre-processing includes at least one of normalizing the set of option identifiers to a standard set of the multiple attributes, categorizing values of the multiple attributes, and conforming the structured supplemental data to a standard format. In other features, the processing includes, for each option identifier in the set of option identifiers, identifying multiple attributes of the option identifier, and associating a feature rank value for each of the multiple attributes according to the assigned preference for the attribute in the profile data structure.

In other features, the processing further includes obtaining a weighting data structure, the weighting data structure including a weight value for each assigned preference in the profile data structure, and for each attribute, generating a weighted score by adjusting the feature rank value associated with the attribute according to the weight value that corresponds to the assigned preference of the attribute. In other features, the processing further includes, for each option identifier in the set of option identifiers, summing the weighted scores for each attribute to generate a total score for the option identifier, and selecting the option identifier having the highest total score as the recommendation output.

In other features, the method includes storing the recommendation output in a database. In other features, the method includes automatically generating a survey, the automatically generated survey including multiple data fields for obtaining the response data from the entity. In other features, the method includes presenting an interactive voice interface to the entity to generate audio questions and prompts based on the automatically generated survey, and using natural language processing (NLP) to classify voice survey responses of the entity.

In other features, the method includes transforming the user interface to display the automatically generated survey to the entity, to obtain the response data from the entity via the user interface. In other features, the option criteria includes at least one of an employer of the entity and a location of the entity.

A computer system includes memory configured to store a machine learning model, historical feature vector inputs and computer-executable instructions. The historical feature vector inputs include historical profile data structures specific to multiple entities, historical structured supplemental data, and historical structured data for a plurality of option identifiers. The system also includes at least one processor configured to execute the instructions. The instructions include training the machine learning model with the historical feature vector inputs to generate a recommendation output, and generating a set of inputs specific to an entity, where the set of inputs derived according to response data obtained from the entity. The instructions include transforming the set of inputs into a profile data structure. The profile data structure includes multiple attributes. The transforming includes, for each attribute, assigning a preference according to the set of inputs. The instructions also include obtaining structured supplemental data associated with the entity. The structured supplemental data includes at least one of medical claim history data fields associated with the entity, demographic data fields associated with the entity, environmental data fields associated with a location of the entity, public health data fields associated with the location of the entity, and financial data fields associated with the entity. The instructions further include obtaining a set of option identifiers from the plurality of option identifiers. Obtaining the set of option identifiers includes filtering the plurality of option identifiers according to option criteria specific to the entity. The instructions also include creating a feature vector input according to the set of option identifiers, the structured supplemental data, and the assigned preferences of the profile data structure, and processing, by the machine learning model, the feature vector input to generate the recommendation output. The recommendation output includes at least one of the set of option identifiers having a greater match score than another of the set of option identifiers based on the structured supplemental data and the assigned preferences of the profile data structure. The instructions include transforming a user interface based on the recommendation output, to display the recommendation output to the entity.

In other features, the instructions further include determining whether historical profile data structures are stored in a database with corresponding structured supplemental data and selected option identifiers, generating the historical feature vector inputs using the historical profile data structures stored in the database, in response to a determination that historical profile data structures are stored in a database with corresponding structured supplemental data and selected option identifiers, and generating the historical feature vector inputs using created sample profile data structures, in response to a determination that historical profile data structures are not stored in a database with corresponding structured supplemental data and selected option identifiers.

In other features, training the machine learning model includes comparing multiple recommendation outputs of the machine learning model to historical option identifier selections or created sample option identifier selections, determining whether an accuracy of the comparison is greater than or equal to a specified accuracy threshold, adjusting parameters of the machine learning model or selecting a different machine learning model type for retraining the machine learning model, in response to a determination that the accuracy of the comparison is less than the specified accuracy threshold, and saving the machine learning model for use in generating recommendation outputs, in response to a determination that the accuracy of the comparison is greater than or equal to the specified accuracy threshold.

In other features, training the machine learning model includes training multiple machine learning model types simultaneously or in succession, identifying one of the multiple machine learning model types having a highest output accuracy compared to the other machine learning model types, and saving the identified machine learning model type having the highest output accuracy for use in generating recommendation outputs.

In other features, the instructions further include pre-processing the structured supplemental data and the set of option identifiers to generate the feature vector input. The pre-processing includes at least one of normalizing the set of option identifiers to a standard set of the multiple attributes, categorizing values of the multiple attributes, and conforming the structured supplemental data to a standard format.

In other features, the processing includes, for each option identifier in the set of option identifiers, identifying multiple attributes of the option identifier, and associating a feature rank value for each of the multiple attributes according to the assigned preference for the attribute in the profile data structure. In other features, the processing further includes obtaining a weighting data structure, the weighting data structure including a weight value for each assigned preference in the profile data structure, and for each attribute, generating a weighted score by adjusting the feature rank value associated with the attribute according to the weight value that corresponds to the assigned preference of the attribute.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3 is an example user profile table illustrating preferences assigned to health plan attributes according to survey responses.

FIG. 5A is an example health care benefit plan table showing various plan attributes for different health plan options.

FIG. 5B is an example supplemental data table illustrating supplemental data values that may be obtained for a user.

FIG. 7A is an example health care benefit plan table where attributes of different health plan options are separated into multiple categories.

FIG. 7B is an example weight table illustrating weight values that may be applied to user preferences for each health plan attribute.

FIG. 9A is an example table of ranked health plan feature scores.

FIG. 9B is an example weighting factor scale table, for weighting the ranked scores of FIG. 9A.

FIG. 9C is an example table illustrating weighted health plan feature totals for multiple health plan options.

FIG. 9D is an example plan recommendation detail table based on an output of the machine learning model.

In the drawings, reference numbers may be reused to identify similar and/or identical elements.

DETAILED DESCRIPTION

Healthcare enrollment is often a complex process that may be difficult for individuals having little experience with details of various health care plan options. These individuals are often left to sift through one-size-fits-all health plan offerings without any meaningful guidance. In addition, an individual may not be aware of all of the various factors that can impact selection of the best plan specific to the individual's needs, which may lead to frustration and confusion.

In various implementations, a machine learning model may be used to evaluate and recommend health plan offerings based on specific preferences of a user, in addition to supplemental data associated with the user. For example, a user may be guided to build a profile with customized preferences for health plan affordability, provider options, individual or family coverage, etc. A user profile may be combined with supplemental data such as prior claim history of the user, environmental factors associated with a location of the user, public health factors associated with the location or demographics of the user, etc., in order to provide a multidimensional input to the machine learning model. After the machine learning model determines one or more health plan offerings that best match a user's specific needs, an interface may allow the user to view results of the analysis including projected costs for each recommended plan, and a comparison of important plan attributes for each recommended plan.

Automated Health Plan Recommendation System

Figure 1:
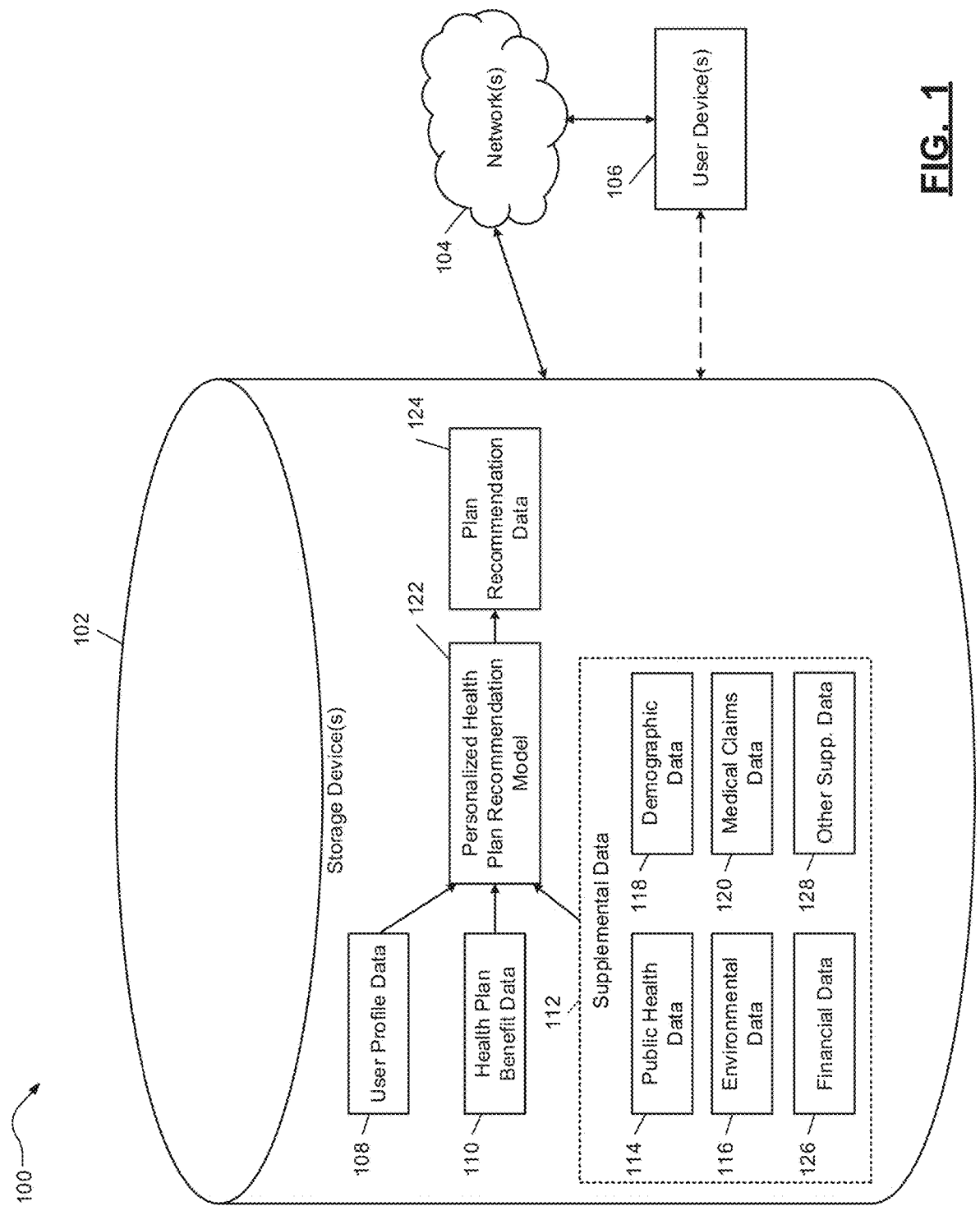
FIG. 1 is a functional block diagram of an example system that uses a machine learning model for automated health plan recommendation.

FIG. 1 is a block diagram of an example implementation of a system 100 that uses a machine learning model for automated health plan recommendation, including a storage device 102. While the storage device 102 is generally described as being deployed in a computer network system, the storage device 102 and/or components of the storage device 102 may otherwise be deployed (for example, as a standalone computer setup). The storage device 102 may be a desktop computer, a laptop computer, a tablet, a smartphone, etc.

As shown in FIG. 1, the storage device 102 includes user profile data 108, health plan benefit data 110, and supplemental data 112. The supplemental data includes public health data 114, environmental data 116, demographic data 118, medical claims data 120, financial data 126, and other supplemental data 128. The storage device 102 also includes a personalized health plan recommendation model 122 and plan recommendation data 124. The user profile data 108, health plan benefit data 110, supplemental data 112, personalized health plan recommendation model 122, and plan recommendation data 124, may be located in different physical memories within the storage device 102, such as different random access memory (RAM), read-only memory (ROM), a non-volatile hard disk or flash memory, etc. In some implementations, one or more of the user profile data 108, health plan benefit data 110, supplemental data 112, personalized health plan recommendation model 122, and plan recommendation data 124, may be located in the same memory (such as in different address ranges of the same memory).

As described further below, the user profile data 108 may include responses from an entity (such as an individual or a family searching for health plans to enroll in), to a survey. A set of inputs may be generated according to the response data from the user. The set of inputs may indicate user preferences for a health plan, which may be used to generate a profile data structure for the user (such as by transforming the set of inputs into the profile data structure according to an automated rules engine). For example, a user may be presented with multiple survey questions via the user device 106, as part of a self-service process that allows the user to indicate their preferences as part of a prediction tool. The user preferences may be in the form of simple questions and responses that do not use complex healthcare jargon.

The survey may be passive or interactive. In various implementations, the survey may include an email survey, a print or mailed survey, a phone survey, a web application, etc. An interactive survey may use natural language processing (NLP) to classify user voice responses and follow up with appropriate prompts or questions. One or more translation modules may be used to translate the user's responses into a user profile table (such as a profile data structure) that can later be used by the personalized health plan recommendation model 122.

The user device 106 may include any suitable device for displaying survey questions to the user and receiving user responses, such as a desktop computer, a laptop computer, a tablet, a smartphone, etc. The user device 106 may access the storage device 102 directly, or may access the storage device 102 through one or more networks 104. Example networks may include a wireless network, a local area network (LAN), the Internet, a cellular network, etc.

The health plan benefit data 110 and the supplemental data 112 may be supplied as input to the personalized health plan recommendation model 122, along with the user profile data 108, as explained further below. For example, the health plan benefit data 110 may include information about various available health plans that the user can choose from, which may be specified according to an employer of the user or a location of the user. In various implementations, a set of option identifiers (such as health plan options that the user may enroll in), are stored in the storage device 102.

The supplemental data 112 may include additional factors that can impact the recommendation of the best plan for the user, and may include public health data 114 such as identified virus hotspot locations, demographic data 118 such as age and sex of the user, environmental data 116 such as a geographic location of the user and corresponding climate, medical claims data 120 such as a prior medical claim history for an individual or a family, financial data 126 such as details of the user's income level, and other supplemental data 128 that may be relevant to a user's health plan preferences. Each of the types of data may be stored as one or more data fields in the storage device 102. Although example health plan benefit data 110 and supplemental data 112 are illustrated in FIG. 1, in various implementations more or less (or other) data may be supplied to the personalized health plan recommendation model 122.

The personalized health plan recommendation model 122 may receive the various input data and process the data using a machine learning model to recommend a best health plan selection for the user in view of the available data. For example, a machine learning model may take into account user preferences from the user profile data 108, all available health plan information from the health plan benefit data 110, relevant factors from supplemental data 112 such as the user demographics, location, medical history, and environmental factors, etc. After running the machine learning model on the input data, the personalized health plan recommendation model 122 may output plan recommendation data 124. The plan recommendation data 124 may include one or more health plans that have been identified as best suited to the user's preferences and other individual factors, and the one or more recommended plans may be presented to the user via the user device 106.

Although FIG. 1 illustrates health plan benefit data 110 and a personalized health plan recommendation model 122, in various implementations the personalized health plan recommendation model 122 may be used in industries other than healthcare, to provide recommendations among various options based on user preferences assigned according to survey responses. The machine learning model may combine the assigned user preferences with supplemental data and available option data to make a recommendation to the user from among the available options.

Figure 2:
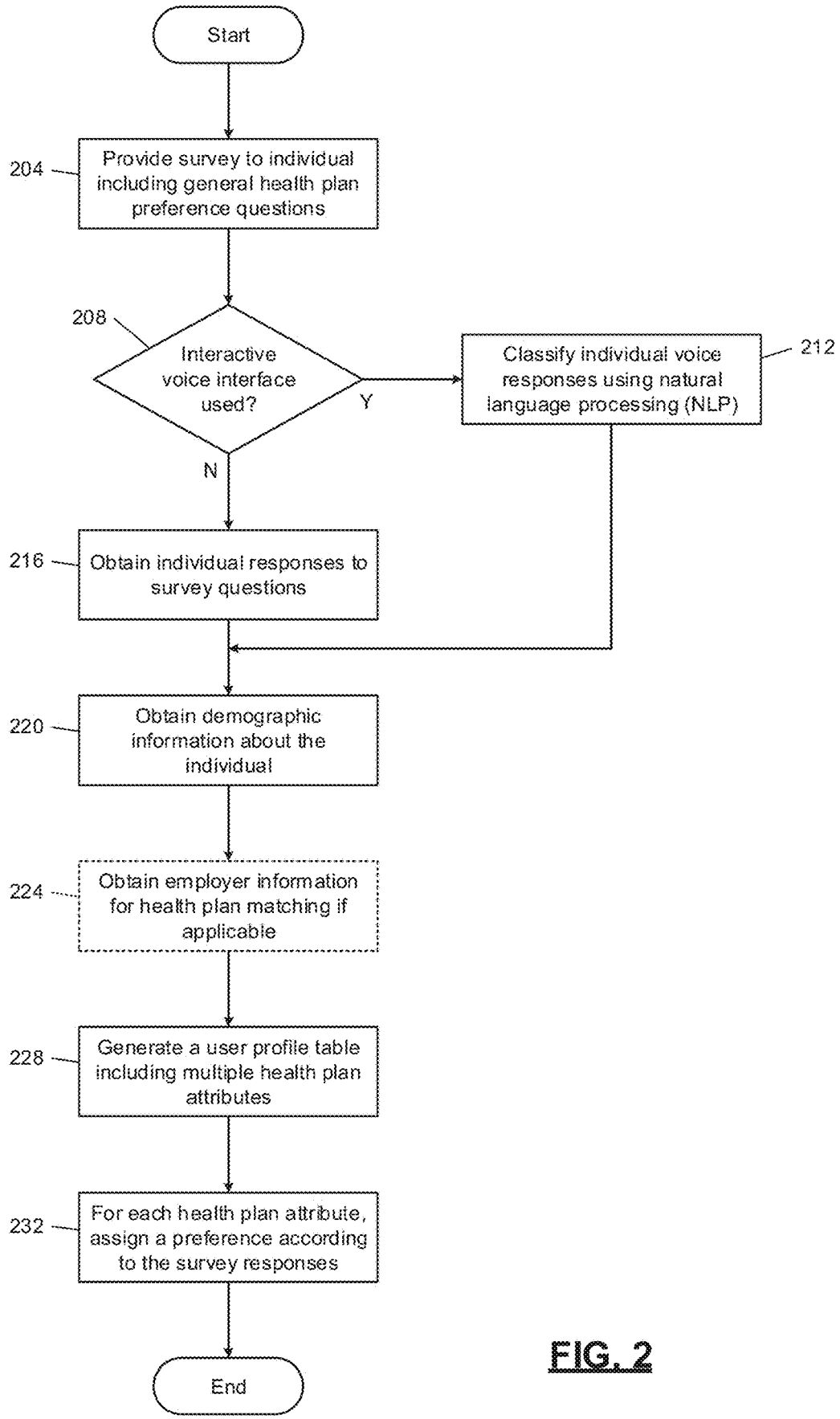
FIG. 2 is a flowchart depicting an example method for automatically generating a user profile and input for the machine learning model.

FIG. 2 illustrates an example process for automatically generating a user profile table, using the system 100. In this example, the user profile table is generated for an individual. In various implementations, a user profile table may be generated for a family or other group of multiple users that are seeking a combined medical insurance health plan. At 204, control begins by providing a survey to an individual (such as a prospective member of an insurer, or an employee of a company that offers health plan coverage). The survey includes general health plan preference questions. For example, the survey may use general questions that do not contain specific health plan jargon, such as how important the cost of the plan is to the user, how important spouse or family coverage is, whether the user expects to use the plan frequently or not, if a low deductible is important, if the user would like coverage for prescription drugs, if there are any particular features that are not important, or are required, in a health plan, etc.

At 208, control determines whether the survey uses an interactive voice interface. For example, an interactive voice interface may be used to provide questions or prompts to the user, in order to solicit voice responses to survey questions. If an interactive voice interface is used at 208, control proceeds to 212 to classify the individual's voice responses using natural language processing (NLP), at 212.

If control determines that an interactive voice interface is not being used for the survey at 208, control proceeds to obtain the individual's responses to the survey questions at 216. For example, surveys may be presented in any suitable format, such as email surveys, print surveys including paper mail, web applications, etc. In various implementations, print survey responses may be digitized, such as by optical character recognition or manual data entry.

After the survey responses have been obtained at 216, or classified via NLP at 212, control proceeds to 220 to obtain demographic information about the individual, such as age and sex of the individual. At 224, control optionally obtains employer information for health plan matching, if applicable. For example, if the individual is an employee of an organization, control may obtain details of the specific plans that are offered by the individual's employer in order to determine the best plan from among the employer offerings to recommend to the individual. In various implementations, control may filter a plurality of option identifiers according to option criteria specific to an individual, such as the individual's employer or the individual's location.

At 228, control generates a user profile table including multiple health plan attributes. An example user profile table is illustrated in FIG. 3, and described further below. For each health plan attribute in the user profile table, control assigns a preference according to the member survey responses, at 232. For example, if an individual indicates that cost is an important factor, control may assign a higher preference to plans that have lower premiums (and possibly higher deductibles). If the individual indicates that prescription drug coverage is important, a prescription drug attribute may be assigned a higher preference. Likewise, if the individual indicates that maternity benefits are required (or unnecessary), or indicates that a family plan is required (or unnecessary), control may assign appropriate preferences to those attributes. The above attributes are for purposes of illustration only, and other profile tables may have more or less (or other) attributes in various implementations.

FIG. 3 illustrates an example user profile table with preferences assigned to different health plan attributes, according to an individual's survey responses. As shown in FIG. 3, several example health plan attributes are listed, including individual plan coverage, medical coverage options (in contrast with prescription only coverage), low premiums, high deductibles, in-network provider options, health savings account (HSA) options, and maternity benefits. Health plan attributes may be categorized into one or more types, including list attributes (where a preference may be selected from a list of possible attribute values), category attributes (where a preference may be placed in one of multiple category ranges of possible attribute values), and binary attributes (where a preference may either be assigned as having the attribute value or not). Although FIG. 3 lists seven example health plan attributes, in various implementations more or less (or other) health plan attributes may be included in the user profile table.

Each of the attributes is assigned a preference, as illustrated by the column labels at the top of the user profile table in FIG. 3. For example, each health plan attribute may be assigned a preference of 'Required', 'Desired', 'Indifferent', 'Less Desired', or 'Not Desired'. Although FIG. 3 illustrates five different columns for assigning preferences, in various implementations more or less (or other) preference columns may be used.

Each preference may be assigned according to the survey responses from the individual, using any suitable scoring system categorization method, automated analysis of survey response importance indicators, natural language processing classification, etc. As shown in FIG. 3, a 'Required' preference has been assigned to the Individual Plan attribute and to the Medical Coverage plan attribute. In this case, the individual's responses to the survey may have indicated that the individual is only looking for a health plan that includes coverage for just one individual, and includes medical coverage (in contrast to a prescription only coverage plan). A preference of 'Required' may be assigned because the individual stated that they had to have a specific plan feature when responding to the survey, because the user selected an attributes as having the highest possible importance in the survey, because an NLP classification of the user's response identified that the individual used the word required, etc.

As shown in FIG. 3, the user profile table includes an assigned preference of 'Desired' for the Low Premium attribute and the High Deductible attribute. The 'Desired' rating preference may be assigned where an individual indicated they would like a health plan feature although it is not as important as their highest priority health plan features, where the individual indicated in a survey response that the health plan feature would be nice to have, etc. In the example table of FIG. 3, the individual may have indicated that a low premium and high deductible health plan is something that the individual would like to have, although they would not exclude plans that do not meet these features.

A preference of 'Indifferent' was assigned to the In-Network Providers health plan attribute, a preference of 'Less Desired' was assigned to the Health Savings Account health plan attribute, and a preference 'Not Desired' was assigned to the Maternity Benefit health plan attribute. In this example, the individual may have provided neutral or average survey response feedback about the importance of in-network provider options, while the individual indicated that a health savings account is not really an important option, and that the individual has no need for maternity benefits. In various implementations, the user profile table may include other information such as demographic data attributes like the individual's age and location.

Machine Learning Model Input and Training

Figure 4:
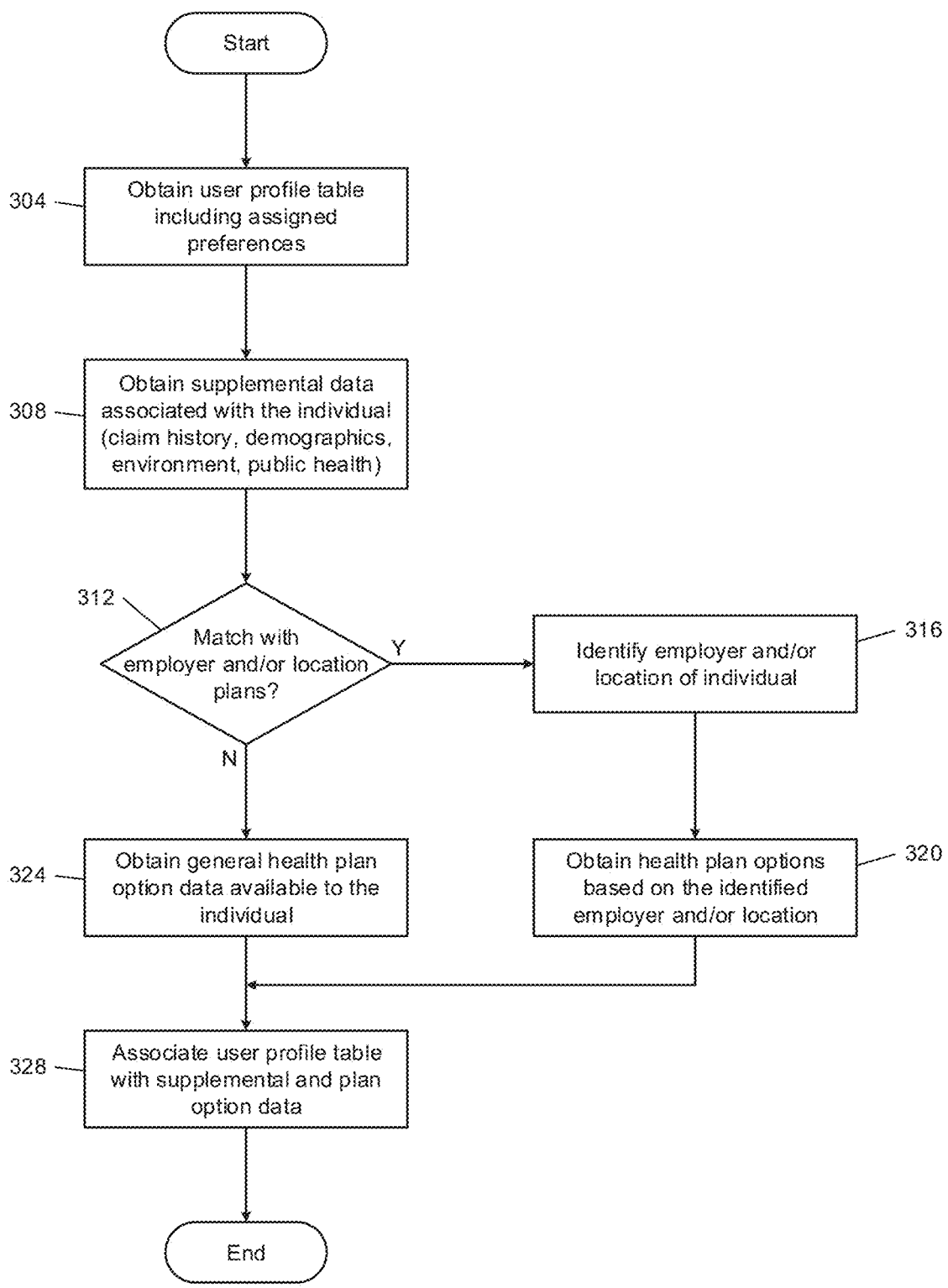
FIG. 4 is a flow chart depicting an example method for generating input for a machine learning model for automated health plan recommendation.

FIG. 4 illustrates an example process for automatically generating a user profile and input for the machine learning model. At 304, control begins by obtaining a user profile table including assigned preferences. For example, control may obtain a user profile table such as the one illustrated in FIG. 3, where different preferences have been assigned for each health plan attribute according to a user's responses to the survey.

At 308, control continues by obtaining supplemental data associated with the individual (or family, if appropriate). As explained below, the supplemental table data may include data such as prior medical claim history of the individual, demographic data of the individual (such as age, sex, location), data about the environment in which individual is located, public health data about the location of the individual (such as current rates of viral infections), financial data of the individual (such as current income level), etc.

Control then proceeds to 312 to determine whether the available health plan options for the individual will be matched with options provided by the employer of the individual, or whether the available health plan options will be filtered according to the individual's location. If so, control proceeds to 316 to identify the individual's employer and/or a location of the individual. At 320, control obtains health plan options for the individual based on the identified employer and/or location.

If control determines at 312 that the available health and options for the individual will not be matched to an employer or location, control proceeds to 324 to obtain general health plan option data that is available to the individual (such as all health plan options provided by a prospective health insurance company). At 328, control associates the user profile table with the supplemental data and health plan option data. For example, the supplemental data obtained at 308 and the health plan option data obtained at 320 or 324 may be stored with the user profile table, appended to the user profile table, etc. In various implementations, the associated user profile, supplemental data and health plan option data may be provided as an input to a machine learning model, such as the personalized health plan recommendation model 122.

FIG. 5A is an example health care benefit plan table showing various plan attributes for different health plan options. For example, the table in FIG. 5A includes information about a family or individual plan type for each health plan option, medical coverage for each plan, the premium for each plan, the deductible for each plan, whether in-network provider options are available for the plan, whether the plan includes an HSA employer contribution, whether the plan provides any maternity benefits, and whether the plan includes comprehensive COVID-19 coverage. In various implementations, other health care benefit plan tables may include more or less (or other) health plan attributes.

As shown in FIG. 5A, Plan A and Plan B are individual coverage plan types, while Plan C is a family coverage plan type. Each of the plans includes a medical coverage option, and the plans have different listed premiums and deductibles. All of the three plans include in-network provider options, while each plan has a different HSA employer contribution amount. Plan A does not include any maternity benefits, while Plans B and C have different coverage amounts for maternity benefits. The comprehensive COVID-19 coverage varies among the three plans.

FIG. 5B is an example supplemental data table illustrating supplemental data values that may be obtained for an individual. As shown in FIG. 5B, the Public Health category includes information about whether the individual's location is a COVID-19 hotspot, whether COVID-19 is likely be more infectious and contagious at the individual's location, and whether COVID-19 is expected to be more dangerous for the individual's age demographic. Although FIG. 5B refers to COVID-19, various implementations may include Public Health data about any viral or other public health condition that may affect the individual.

Under the Claim category, the supplemental data table indicates whether the individual has any prior medical claims indicative of high-risk health conditions. As shown in FIG. 5B, the individual has prior medical claim history for respiratory illness. The Demographic category indicates important demographic features of the individual, such as a virus fatality rate for the individual's age group at the individual's location. The Environmental category indicates features that may be unique to the individual's location, such as higher than normal temperatures that could lead to increased spread of a viral disease. In various implementations, other supplemental data tables may include more or less (or other) supplemental data categories and features, such as financial data including an income of the individual.

Figure 6:
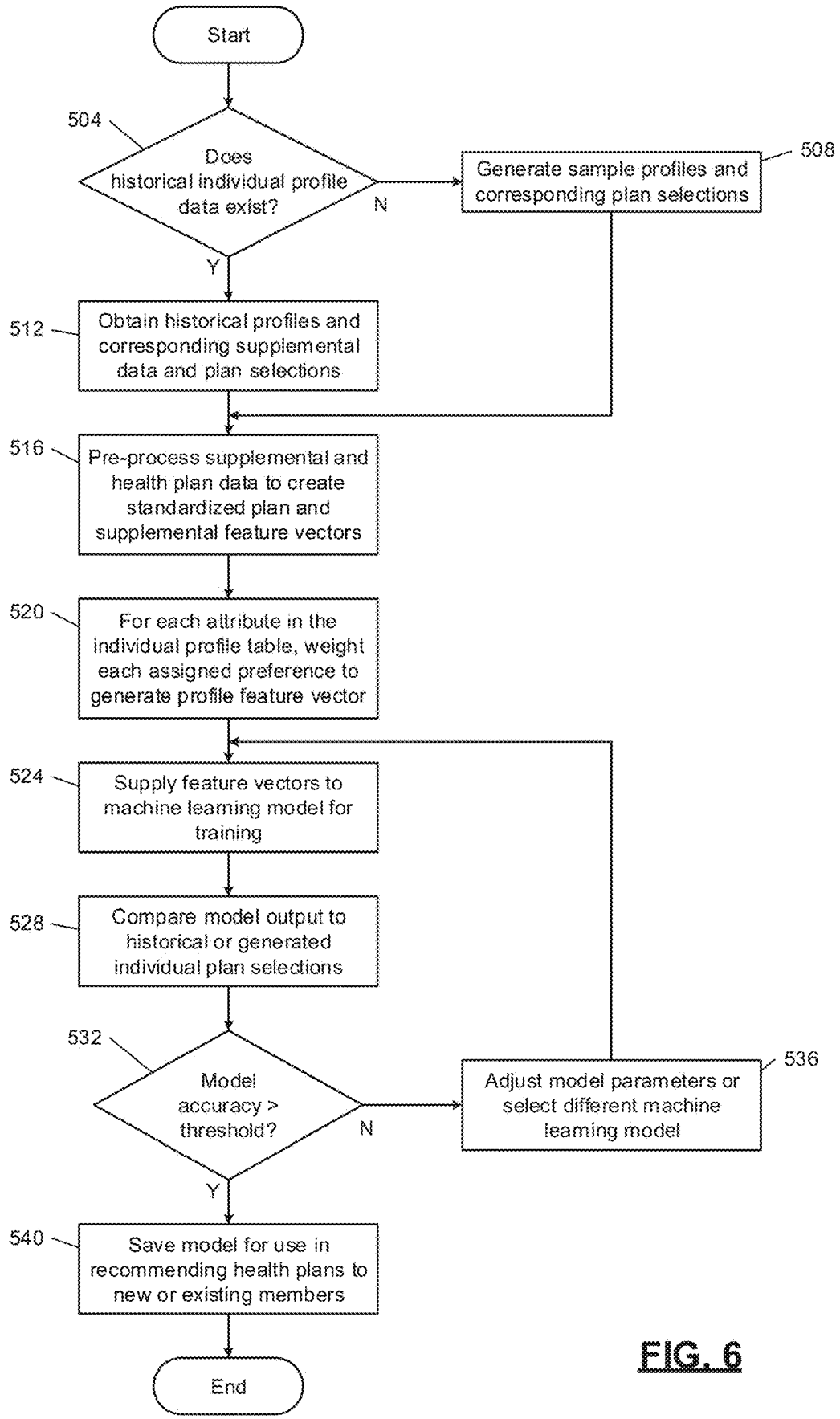
FIG. 6 is a flow chart depicting an example process for training a machine learning model to provide automated health plan recommendations to users.

FIG. 6 illustrates an example process for training a machine learning model to provide automated health plan recommendations to individuals. At 504, control begins by determining whether historical user profile data exists. If not, control proceeds to 508 to generate sample profiles and corresponding plan selections. For example, if historical user profile data does not already exist for training the machine learning model, an administrator may need to generate sample profiles and corresponding plan selections for initial model training, until individuals start using the system to make their own plan selections with corresponding profiles. Sample profiles may be generated by creating example survey responses and then determining a plan that the hypothetical user would be most likely to select. In various implementations, historical feature vector inputs may be used to generate a recommendation output. The historical feature vector inputs may include historical profile data structures specific to multiple entities, historical structured supplemental data, historical structured for a plurality of option identifiers, etc. In various implementations, the machine learning model may be supplied with training data or testing data other than feature vectors.

If control determines that historical profile data does exist at 504, control proceeds to 512 to obtain historical profiles and corresponding supplemental data and plan selections. For example, control may obtain profiles of individuals that have selected plans in the past, as well as supplemental data corresponding to the individuals. In various implementations, historical profile data may be combined with sample profiles created by administrator if the sample size of the historical user profile data is not large enough.

At 516, control pre-processes supplemental data and health plan data to create standardized health plan and supplemental feature vectors. For example, the data may be cleaned, conformed, enriched, integrated, etc., using any suitable processes for standardizing the data. Data from disparate healthcare sources, such as different health insurance companies, may be normalized to a standard set of attributes. Data may be wrangled prior to inputting the data to the machine learning model, such as by categorizing attributes or translating the attribute values into discrete features (for example, by dividing continuous premium or deductible amounts into two or more categories such as high and low). An example of pre-processed data is illustrated in FIG. 7A, and described further below.

Control then proceeds to 520 where, for each attribute in the user profile table, control weights the assigned preference to generate a weighted profile feature vector. For example, FIG. 7B illustrates an example mapping of weights to assigned preferences, and FIGS. 9B and 9C illustrate an example case of applying weights to ranked attributes of a health plan options table.

At 524, control supplies the feature vectors to a machine learning model for training, and then compares the model output to historical plan selections (or generated sample plan selections), at 528. Control then determines whether the model accuracy is greater than an accuracy threshold at 532. For example, the accuracy threshold may be any suitable threshold indicative that the model is accurately predicting which health plan will be selected by the user based on their profile table and corresponding supplemental data, with a desired degree of success (such as at least fifty percent accuracy, at least ninety percent accuracy, etc.).

If control determines at 532 that the model accuracy is not greater than or equal to the specified accuracy threshold, control proceeds to 536 to adjust model parameters or select a different machine learning model. For example, parameters of the machine learning model may be adjusted to increase its accuracy in subsequent model training, or a different machine learning model altogether may be selected. In various implementations, multiple machine learning model types may be run simultaneously or in succession, where control than selects the most accurate model from the multiple output results. If control determines at 532 that the machine learning model accuracy is greater than the specified accuracy threshold, control proceeds to save the trained machine learning model for use in recommending health plans to new or existing members at 540.

FIG. 7A illustrates an example health care benefit plan table where attributes of the different health plan options have been ranked using a breakdown of different health plan attributes. For example, instead of illustrating just the premium amount for each plan, the table in FIG. 7A includes three rows for different premium categories: a low premium category; a moderate premium category; and a high premium category. As shown in FIG. 7A, the Plan A premium value of $5,000 has been placed in the low premium category, while the premium values of $6,000 for Plan B and Plan C are placed in the moderate premium category. Each of the plans has been assigned a value of 'n/a' for the high premium category, because the premium amounts for all three plans do not fall into the high premium category range. For example, if another plan was added having a premium value of $10,000, and the value of $10,000 fell within the high premium category range, the additional plan may receive a value of 'n/a' in the low and moderate premium categories, and a value of $10,000 may be listed in the high premium category row.

Similarly, the deductible amounts have been divided into low deductible, moderated deductible, and high deductible categories. The deductible value of $3,000 for Plan B is placed in the low deductible category, the deductible value of $4,000 for Plan A is placed in the moderate deductible category, and the deducible value of $5,000 for Plan A is placed in the high deductible category. The plan options each have values of 'n/a' assigned in deductible categories that do not apply to the plans.

FIG. 7B illustrates example weightings that may be applied to individual preferences for each health plan attribute. These weightings may be used to score ranked attribute preferences of the individual, as explained further below. As shown in FIG. 7B, any health plan attributes that were assigned a preference of 'Required' based on the individual's survey responses may receive weight of 3, while each attribute having an assigned preference of 'Desired' receives a weight of 2.5, each attribute having an assigned preference of 'Indifferent' receives a weight of 2, each of attribute having an assigned preference of 'Less Desired' receives a weight of 1.5, and each attribute having an assigned preference of 'Not Desired' receives a weight of 0.

Automated Plan Recommendation Process

Figure 8:
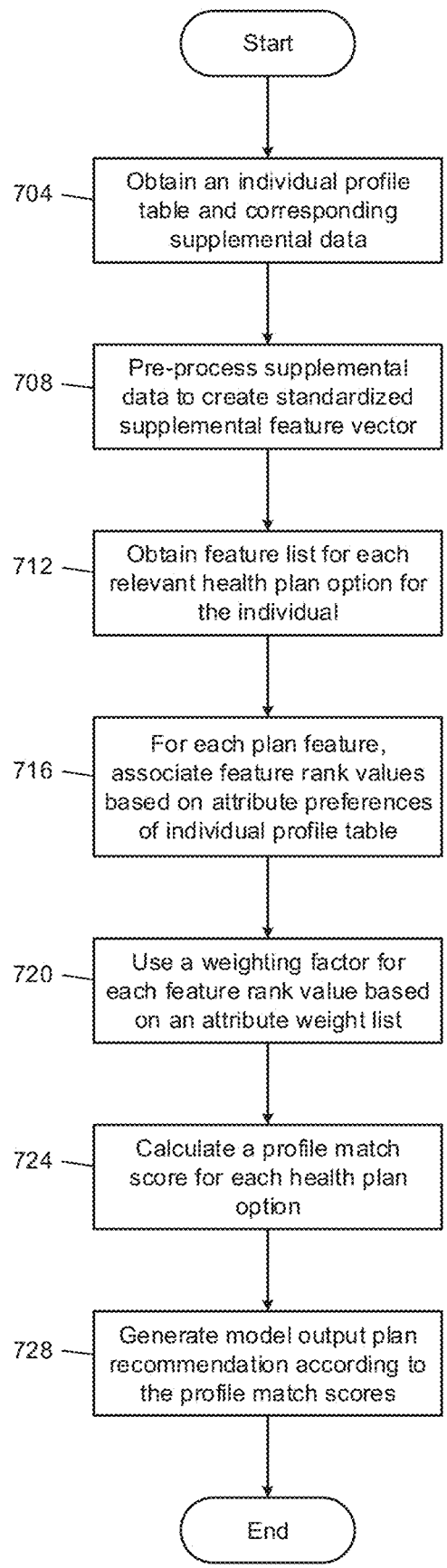
FIG. 8 is a flow chart depicting an example process for automatically generating an output plan recommendation using a machine learning model.

FIG. 8 illustrates an example process for automatically generating an output plan recommendation using a machine learning model, such as the personalized health plan recommendation model 122. At 704, control begins by obtaining a user profile table and corresponding supplemental data. At 708, control pre-processes the supplemental data to create a standardized feature vector. At 712, control then obtains a feature list for relevant health plan option for the individual. For example, relevant health plan options may be determined by identifying health plans offered by an employer of the individual, health plans offered at a location of the individual, general health plans offered by insurance companies that the individual is considering, etc.

At 716, for each health plan feature, control associates a feature rank value based on corresponding attribute preferences from the user's profile table. An example feature rank value table is illustrated in FIG. 9A, and discussed further below. At 720, control uses a weighting factor for each feature rank value, based on an attribute weight list (such as the attribute weight list illustrated in FIG. 7B). An example table of weighted rank values is illustrated in FIG. 9B, and a table of resulting weighted attributes is illustrated in FIG. 9C.

Control proceeds to calculate a profile match score for each health plan option at 724. For example, FIG. 9C illustrates example profile match scores for each of Plan A, Plan B and Plan C. The profile match scores may include a sum of the weighted, ranked attribute values. At 728, control generates a model output plan recommendation according to the profile match scores. For example, control may select one or more health plan options having a highest score or scores, for recommendation to the individual. FIG. 9D illustrates an example recommend plan table that may be presented to the individual. In various implementations, control may transform a user interface based on the recommendation output, to display the recommendation output to an individual. The recommendation output may be stored in a database.

FIG. 9A illustrates an example table of ranked health plan feature scores, where values for each health plan attribute are ranked according to the individual's assigned attribute preferences. In the example of FIG. 9A, Plan A and Plan B each receive a rank score of 2 for the Plan Type category, while Plan C receives a rank score of 0. This is because the individual's survey responses indicated that they required an individual coverage plan. Therefore, Plan A and Plan B each received a rank score of 2 because they are individual coverage plans, while Plan C received a score of 0 because it is a family coverage plan. In this example, because Plan C does not provide the required individual coverage, the remaining plan attributes of Plan C are each ranked with 'n/a'. Although FIG. 9A illustrates rank score values of 0, 1 and 2, various implementations may use other rank score values.

Next, the low premium, moderate premium and high premium categories are ranked according to the individual's assigned premium preference. For example, because the individual indicated that a low premium is desired, Plan A received the highest rank score value of 2 based on its lowest premium amount, and Plan B received a rank score value of 1 because it has a moderate premium amount. Similarly, because the individual's assigned preference is 'Desired' for a low deductible, Plan B receives the rank score value of 2 for having the lowest deductible, while Plan A receives a rank score value of 1 for having a moderate deductible.

Both Plan A and Plan B include In-Network Provider options, so each plan receives a rank score value of 2. Because Plan A provides a greater HSA employer contribution amount than Plan B, Plan A receives rank score value of 2 and Plan B receives a rank score value of 1 for the HSA Employer Contribution category. The individual's assigned preference for the Maternity Benefit was 'Not Desired', so Plan A and Plan B are both assigned a rank score value of 0 for the Maternity Benefit category. Because Plan A provides a higher percentage of comprehensive COVID-19 coverage than Plan B, Plan A receives a higher rank score value of 2 in the Comprehensive COVID-19 Coverage category, and Plan B receives a rank score value of 1.

FIG. 9B illustrates an example weighting factor scale table. In this example, the weights from FIG. 7B are applied to the rank score values from FIG. 9A. As shown in FIG. 9B, the weighted score is set to 0, 3 or 6 (depending on the rank score value) for a plan attribute that has been assigned a preference of 'Required' for the individual. Any attribute having a rank score value of 2 will be weighted as 5 if the assigned attribute preference is 'Desired', will be weighted as 4 if the assigned preference is 'Indifferent', will be weighted as 2.5 if the assigned preference is 'Less Desired', and will be weighted as 0 if the assigned preference is 'Not Desired'.

FIG. 9C illustrates example weighted health plan feature totals for Plans A, B and C, after the weights from FIG. 9B are applied to the rank score values from FIG. 9A. For example, as shown in FIG. 9C, the ranks score values of 2 for the Plan Type and Medical Coverage categories have weighted scores of 6 because the individual's assigned preference for these attributes was 'Required'. The Premium and Deductible weighted scores of 5 and 2.5 are assigned based on the individual's preference of 'Desired' for these attributes.

Because the individual indicated that the In-Network Provider category had an 'Indifferent' preference, the weighted score values are set to 4. The HSA Employer Contribution category had an assigned preference of 'Less Desired' and therefore receives weighted scores of 2.5 and 1.5, respectively. The individual indicated that maternity coverage is 'Not Desired', so those categories are given a weight of 0.

The weighted scores are then summed for each of Plan A, Plan B and Plan C, to generate an overall plan score. As noted previously, Plan C was set to zero because it does not include the 'Required' type of individual coverage. When summing the weighted scores values, Plan A had an overall total score of 31, while Plan B only had an overall total score of 27.5. Therefore, the model output may recommend Plan A as the best option for the individual, based on the assigned preferences that were generated according to the individual's survey responses.

FIG. 9D illustrates an example plan recommendation detail table that may be provided to the individual based on output from the machine learning model. For example, the plan recommendation detail table breaks down the plan attributes of the recommended Plan A into features that were assigned a 'Required' preference based on the individual's survey responses, features that were assigned a 'Desired' preference, features that were assigned an 'Indifferent' preference, features that were assigned a 'Less Desired' preference, and features that were assigned a 'Not Desired' preference. FIG. 9D also includes suggested desired features, which may include plan attributes that an individual was not asked about in the survey but could be helpful to inform the individual's plan decision.

The right-hand column of FIG. 9D indicates how well the user profile table matches with the attributes offered by the recommended Plan A. For example, FIG. 9D illustrates that the 'Required' preference attributes of Plan A match the user's profile. Under the 'Desired' plan attributes, the Premium is a match with the user's profile while the Deductible is a partial match (because the deductible is moderate instead of the individual's preference of a low deductible). FIG. 9D also indicates that the 'Indifferent', 'Less Desired', and 'Not Desired' features match the preferences of the user profile table. Further, FIG. 9D also indicates that another potentially desired feature, Comprehensive COVID-19 Coverage, is a suggested match for the user's profile.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WWI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computerized method of automatically generating a recommendation output, the method comprising:
training, by one or more processors, a machine learning model with historical feature vector inputs to generate a recommendation output, wherein the historical feature vector inputs include historical profile data structures specific to multiple entities, historical structured supplemental data including medical claim data, and historical structured data for a plurality of health care plan option identifiers the training of the machine learning model comprising:
determining whether historical profile data structures are stored in a database with corresponding structured supplemental data and selected health care plan option identifiers,
in response to a determination that historical profile data structures are stored in the database with corresponding structured supplemental data and selected health care plan option identifiers, generating the historical feature vector inputs using the historical profile data structures stored in the database,
in response to a determination that historical profile data structures are not stored in a database with corresponding structured supplemental data and selected health care plan option identifiers, generating the historical feature vector inputs using created sample profile data structures,
training, simultaneously or in succession using the generated historical feature input vectors, multiple machine learning models, each model being a different type of machine learning model,
identifying one of the trained multiple machine learning models as having a highest output accuracy compared to the other trained machine learning models, and
saving the identified machine learning model having the highest output accuracy as the machine learning model for use in generating the recommendation outputs;
presenting, by the one or more processors, an interactive voice interface to an entity to generate audio questions and prompts based on an automatically generated survey for obtaining response data from the entity;
using natural language processing (NLP), by the one or more processors, to classify voice survey responses of the entity;
generating, by the one or more processors, a set of inputs specific to the entity, the set of inputs derived according to response data obtained from the entity;
transforming, by the one or more processors, the set of inputs into a profile data structure, wherein the profile data structure includes multiple attributes, and wherein the transforming includes, for each attribute, assigning a preference according to the set of inputs;
obtaining, by the one or more processors, structured supplemental data associated with the entity, wherein the structured supplemental data includes medical claim history data associated with the entity and at least one of demographic data fields associated with the entity, environmental data fields associated with a location of the entity, public health data fields associated with the location of the entity, and financial data fields associated with the entity;
obtaining, by the one or more processors, a set of health care plan option identifiers from the plurality of health care plan option identifiers, wherein obtaining the set of health care plan option identifiers includes filtering the plurality of health care plan option identifiers according to option criteria specific to the entity;
creating, by the one or more processors, a feature vector input according to the set of health care plan option identifiers, the structured supplemental data associated with the entity, and the assigned preferences of the profile data structure;
processing, by the one or more processors and using the identified machine learning model, the feature vector input to generate the recommendation output the recommendation output including at least one of the set of health care plan option identifiers having a greater match score than another of the set of health care plan option identifiers based on the structured supplemental data of the entity and the assigned preferences of the profile data structure; and
transforming, by the one or more processors, a user interface based on the recommendation output, to display the recommendation output to the entity.

2. The method of claim 1 wherein training the machine learning model includes:
comparing multiple recommendation outputs of the machine learning model to historical health care plan option identifier selections or created sample health care plan option identifier selections;
determining whether an accuracy of the comparison is greater than or equal to a specified accuracy threshold;
adjusting parameters of the machine learning model or selecting a different machine learning model type for retraining the machine learning model, in response to a determination that the accuracy of the comparison is less than the specified accuracy threshold; and
saving the machine learning model for use in generating recommendation outputs, in response to a determination that the accuracy of the comparison is greater than or equal to the specified accuracy threshold.

3. The method of claim 1 further comprising pre-processing the structured supplemental data and the set of health care plan option identifiers to generate the feature vector input, wherein the pre-processing includes at least one of:
  normalizing the set of health care plan option identifiers to a standard set of the multiple attributes,
  categorizing values of the multiple attributes, and
  conforming the structured supplemental data to a standard format.

4. The method of claim 1 wherein the processing includes, for each health care plan option identifier in the set of health care plan option identifiers:
  identifying multiple attributes of the health care plan option identifier; and
  associating a feature rank value for each of the multiple attributes according to the assigned preference for the attribute in the profile data structure.

5. The method of claim 4 wherein the processing further includes:
  obtaining a weighting data structure, the weighting data structure including a weight value for each assigned preference in the profile data structure; and
  for each attribute, generating a weighted score by adjusting the feature rank value associated with the attribute according to the weight value that corresponds to the assigned preference of the attribute.

6. The method of claim 5 wherein the processing further includes:
  for each health care plan option identifier in the set of health care plan option identifiers, summing the weighted scores for each attribute to generate a total score for the health care plan option identifier; and
  selecting the health care plan option identifier having a highest total score as the recommendation output.

7. The method of claim 1 further comprising storing the recommendation output in a database.

8. The method of claim 1 wherein the automatically generated survey includes multiple data fields for obtaining the response data from the entity.

9. The method of claim 8, further comprising transforming the user interface to display the automatically generated survey to the entity, to obtain the response data from the entity via the user interface.

10. The method of claim 1 wherein the option criteria includes at least one of an employer of the entity and a location of the entity.

11. A computer system comprising:
  memory hardware including a machine learning model, historical feature vector inputs, and computer-executable instructions, wherein the historical feature vector inputs include historical profile data structures specific to multiple entities, historical structured supplemental data including medical claim data, and historical structured data for a plurality of health care plan option identifiers; and
  processor hardware including one or more processors configured to execute the instructions, wherein the instructions include:
    training, by the one or more processors, the machine learning model with the historical feature vector inputs to generate a recommendation output by:
      determining whether historical profile data structures are stored in a database with corresponding structured supplemental data and selected option identifiers,
      in response to a determination that historical profile data structures are stored in the database with corresponding structured supplemental data and selected option identifiers, generating the historical feature vector inputs using the historical profile data structures stored in the database,
      in response to a determination that historical profile data structures are not stored in the database with corresponding structured supplemental data and selected option identifiers, generating the historical feature vector inputs using created sample profile data structures,
      training, simultaneously or in succession using the generated historical feature input vectors, multiple machine learning models, each model being a different type of machine learning model,
      identifying one of the trained multiple machine learning models as having a highest output accuracy compared to the other trained machine learning models, and
      saving the identified machine learning model having the highest output accuracy as the machine learning model for use in generating the recommendation outputs;
    presenting, by the one or more processors, an interactive voice interface to an entity to generate audio questions and prompts based on an automatically generated survey for obtaining response data from the entity;
    using natural language processing, by the one or more processors, to classify voice survey responses of the entity;
    generating, by the one or more processors, a set of inputs specific to an entity, the set of inputs derived according to response data obtained from the entity;
    transforming, by the one or more processors, the set of inputs into a profile data structure, wherein the profile data structure includes multiple attributes, and wherein the transforming includes, for each attribute, assigning a preference according to the set of inputs;
    obtaining, by the one or more processors, structured supplemental data associated with the entity, wherein the structured supplemental data includes medical claim history data associated with the entity and at least one of demographic data fields associated with the entity, environmental data fields associated with a location of the entity, public health data fields associated with the location of the entity, and financial data fields associated with the entity;
    obtaining, by the one or more processors, a set of health care plan option identifiers from the plurality of health care plan option identifiers, wherein obtaining the set of health care plan option identifiers includes filtering the plurality of health care plan option identifiers according to option criteria specific to the entity;
    creating, by the one or more processors, a feature vector input according to the set of health care plan option identifiers, the structured supplemental data associated with the entity, and the assigned preferences of the profile data structure;
    processing, by the one or more processors using the identified machine learning model, the feature vector input to generate the recommendation output the recommendation output including at least one of the set of health care plan option identifiers having a greater match score than another of the set of health care plan option identifiers based on the structured supplemental data of the entity and the assigned preferences of the profile data structure; and transforming, by the one or more processors, a user interface based on the recommendation output, to display the recommendation output to the entity.

12. The computer system of claim 11 wherein training the machine learning model includes:

comparing multiple recommendation outputs of the machine learning model to historical health care plan option identifier selections or created sample health care plan option identifier selections;

determining whether an accuracy of the comparison is greater than or equal to a specified accuracy threshold;

adjusting parameters of the machine learning model or selecting a different machine learning model type for retraining the machine learning model, in response to a determination that the accuracy of the comparison is less than the specified accuracy threshold; and saving the machine learning model for use in generating recommendation outputs, in response to a determination that the accuracy of the comparison is greater than or equal to the specified accuracy threshold.

13. The computer system of claim 11 wherein the instructions further include pre-processing the structured supplemental data and the set of health care plan option identifiers to generate the feature vector input, wherein the pre-processing includes at least one of:

normalizing the set of health care plan option identifiers to a standard set of the multiple attributes, categorizing values of the multiple attributes, and conforming the structured supplemental data to a standard format.

14. The computer system of claim 11 wherein the processing includes, for each health care plan option identifier in the set of health care plan option identifiers:

identifying multiple attributes of the health care plan option identifier; and associating a feature rank value for each of the multiple attributes according to the assigned preference for the attribute in the profile data structure.

15. The computer system of claim 14 wherein the processing further includes:

obtaining a weighting data structure, the weighting data structure including a weight value for each assigned preference in the profile data structure; and for each attribute, generating a weighted score by adjusting the feature rank value associated with the attribute according to the weight value that corresponds to the assigned preference of the attribute.

\* \* \* \* \*